United States Patent [19]
Genovese

[11] Patent Number: 5,519,432
[45] Date of Patent: May 21, 1996

[54] DUAL LASER SOURCE FOR USE IN A RASTER OUTPUT SCANNER

[75] Inventor: Frank C. Genovese, Fairport, N.Y.

[73] Assignee: Xerox Corporation, Stamford, Conn.

[21] Appl. No.: 177,349

[22] Filed: Jan. 4, 1994

[51] Int. Cl.[6] .................................................... B41J 2/47
[52] U.S. Cl. .................................................... 347/260
[58] Field of Search ................................. 347/259, 260, 347/261, 256; 359/211, 212

[56] References Cited

U.S. PATENT DOCUMENTS

| | | | |
|---|---|---|---|
| 4,468,119 | 8/1984 | Hamar | 359/211 |
| 4,821,113 | 4/1989 | McQuade et al. | 358/75 |
| 4,980,893 | 12/1990 | Thornton et al. | 372/50 |
| 4,989,019 | 1/1991 | Loce et al. | 346/108 |
| 5,140,157 | 8/1992 | Ohshima et al. | 250/235 |
| 5,264,869 | 11/1993 | Appel et al. | 347/251 |

FOREIGN PATENT DOCUMENTS 8912369  12/1989  European Pat. Off. ......... H04N 1/18

*Primary Examiner*—Mark J. Reinhart
*Attorney, Agent, or Firm*—R. Hutter

[57] ABSTRACT

A electrophotographic printing apparatus comprises a first laser source, emitting a first beam in a first direction, and a second laser source, emitting a second beam in a second direction. A roof mirror directs the first beam and the second beam along a third direction, so that the two beams have a substantially coincident virtual source point.

16 Claims, 5 Drawing Sheets

DUAL LASER SOURCE FOR USE IN A RASTER OUTPUT SCANNER

The present invention relates to a laser source, capable of emitting two independent laser beams, for use in a raster output scanner in an electrophotographic printer.

Electrophotographic printers wherein a laser scan line is projected onto a photoconductive surface are well known. In the case of laser printers, facsimile machines, and the like, it is common to employ a raster output scanner (ROS) as a source of optical patterns to be imaged on a pre-charged photoreceptor (a photosensitive plate, belt, or drum) for purposes of xerographic printing. The ROS provides a laser beam which switches on and off according to digital image data associated with the desired image to be printed as the beam moves, or scans, across the photoreceptor. Commonly, the surface of the photoreceptor is selectively imagewise discharged by the laser in locations to be printed white, to form the desired latent image on the photoreceptor. Modulation of the exposure flux that creates the desired latent image on the photoreceptor is made in response to a digital electronic data stream controlling modulation circuitry associated with the laser source. A common technique for effecting the scanning action of the beam moving across the photoreceptor is to employ a rotating polygon surface; the modulated laser beam is reflected by the rotating polygon facets creating a scanning motion of the exposing spot which forms a scan line across the photoreceptor. A large number of scan lines on a photoreceptor together form a raster of the desired latent image. Once a latent image is formed on the photoreceptor, it is subsequently developed with a toner, and the developed image is transferred to a copy sheet, as in the well-known process of xerography.

FIG. 6 shows the basic configuration of a scanning system used, for example, in an electrophotographic printer or facsimile machine. A laser source 10 produces a collimated laser beam, also referred to as a "writing beam" 12, which is reflected from the facets of a rotating polygon 14. Each facet of the polygon 14 in turn deflects the writing beam 12 to create an illuminated beam spot 16 on the pre-charged surface of photoreceptor 18. The energy of the beam spot 16 on a particular location on the surface of photoreceptor 18, corresponding to a picture element (pixel) in the desired image, discharges the surface for those elements of the desired image which are to be printed white. In locations having pixels which are to be printed black, the writing beam 12 is at the moment of scanning interrupted, such as by a modulator controlled by imagewise digital data, so the location on the surface of photoreceptor 18 will not be discharged. Thus, digital data input into laser source 10 is rendered line by line as an electrostatic latent image on the photoreceptor 18.

When the beam spot 16 is caused, by the rotation of polygon 14, to move across photoreceptor 18, a scan line 20 of selectively discharged areas results on photoreceptor 18. The surface of photoreceptor 18, whether it is a belt or drum, moves in a process direction; the motion of spot 16 through each scan line 20 is transverse to the process direction. The periodic scanning of beam spot 16 across the moving photoreceptor 18 creates an array of scan lines 20, called a raster 22, on the photoreceptor 18, forming the desired image to be printed. One skilled in the art will appreciate that such a configuration will typically further include any number of lenses and mirrors to accommodate a specific design.

In the prior art there has been proposed numerous schemes for increasing the process speed, in terms of converting digital electronic data into an image on the photoreceptor, of the basic ROS system. Speed and/or resolution of a system can be increased by scanning multiple beams simultaneously across the photoreceptor 18 rather than a single writing beam 12. In such a system, a plurality of substantially parallel writing beams are caused to reflect from one facet of the rotating mirror, to provide on the surface of the photoreceptor a simultaneous series of parallel scan lines. The digital image data controlling each of the plurality writing beams is so arranged that, when successive scans of the plurality of writing beams are scanned across the photoreceptor, the writing beams may be advantageously "interleaved" to form the desired latent image. An example of such a system is shown in U.S. Pat. No. 4,989,019, assigned to the assignee hereof.

The use of multiple writing beams to cooperatively generate latent images on a photoreceptor creates practical problems which must be addressed, particularly in ensuring that the multiple beams are properly aligned and matched to form an accurately-rendered latent image on the photoreceptor, and that the expense of providing two independently-controllable laser sources in a single apparatus is warrented over other methods. U.S. Pat. No. 5,140,157 discloses a system having two writing beams, wherein the intensity of each beam is continually checked and compared to verify that the intensity of each beam is equal. U.S. Pat. No. 4,980,893, assigned to the assignee hereof, discloses one proposed design for a set of independently addressable laser sources. As described in the patent, the fabrication of two or more very closely spaced semiconductor laser emitters on a single monolithic device creates practical difficulties include phase locking and mutual electrical and thermal interference among the plurality of emitters on the single semiconductor surface. Thus, even though the use of multiple semiconductor laser sources may seem optically straightforward and the semiconductor devices themselves may be relatively inexpensive to fabricate, the creation of a scanning system using two closely-spaced but independent sources is not a trivial engineering problem.

U.S. Pat. No. 4,821,113 discloses a raster output scanner having two laser diodes which are simultaneously modulated, and whose beams are combined by a beam combiner into a single colinear beam. The purpose of such an arrangement is to double printing speed or data throughput rate for the system without compromising optical performance.

PCT application WO 89/12369 disclose a multi-beam scanning system wherein a plurality of laser sources are directed to a convergence point, from which they diverge to given locations on a photoreceptor. One lens is placed at the convergence point and, in combination with another lens, forms a "telescope" which both magnifies individual beam spots and reduces the angles between beams, reducing the sensitivity of the system to angular deviations.

In general, the key problems with using multiple laser sources in a ROS are: (1) the expense of providing two independent laser sources; (2) the manufacturing yield reduction resulting from the product of imperfect yield rates for each element and process compounded on a single structure; (3) the general engineering problems of electrical and thermal cross-talk, and phase-locking considerations with multiple lasers in a single structure or package; and (4) the focusing and spot placement problems associated with multiple laser sources intended for generating exactly parallel scans on the photoreceptor surface that are spaced at a precise and predictable distance apart through the entire scan line.

According to the present invention, there is provided a scanning system comprising a first laser source, emitting a first beam in a first direction, and a second laser source, emitting a second beam in a second direction. A roof mirror directs the first beam and the second beam along a third direction, so that the two beams have a substantially coincident virtual source point.

Figure 1:
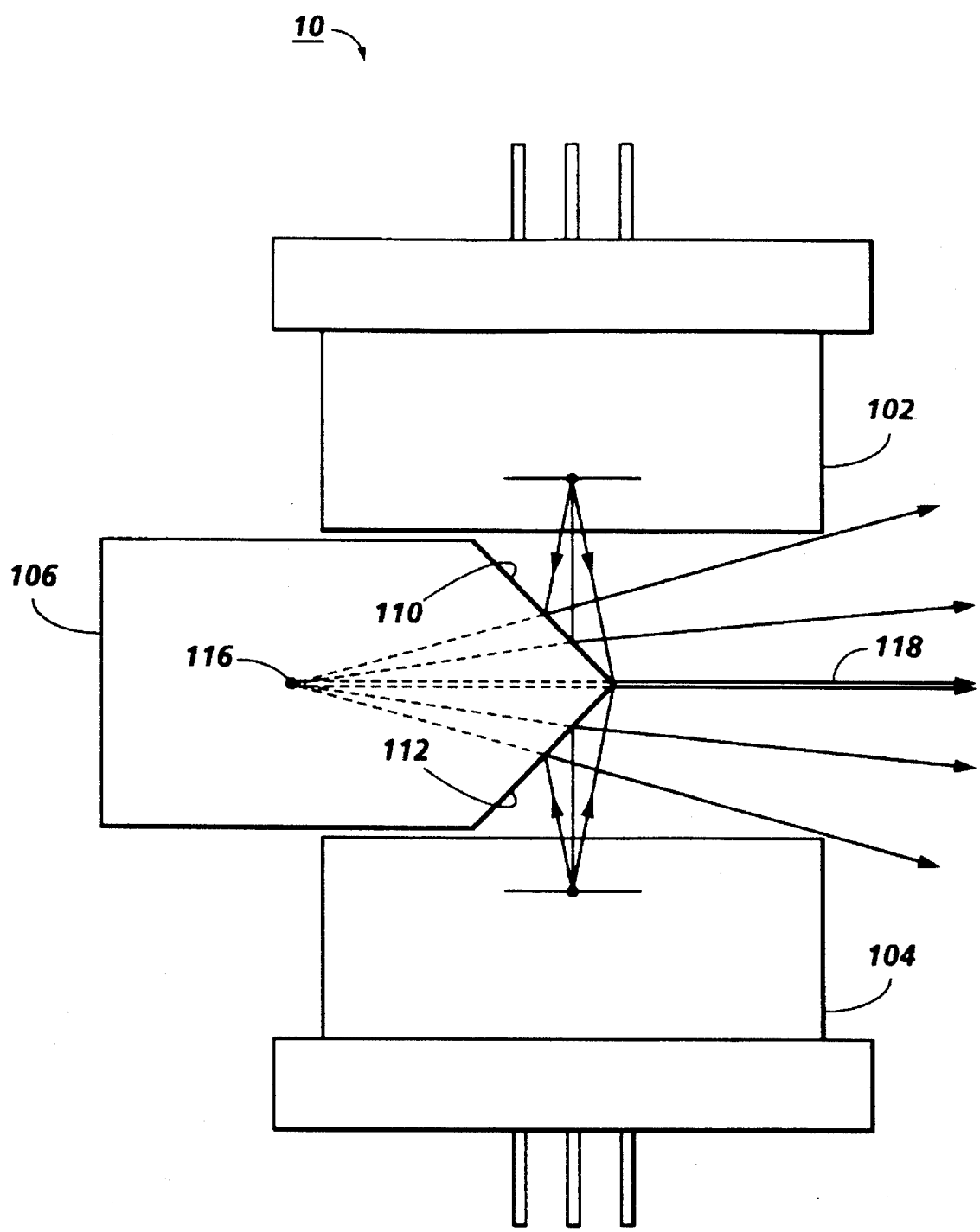
FIG. 1 is an elevational view showing the essential elements of a dual laser source according to the present invention.

FIG. 1 is an elevational view showing the essential elements of a dual laser source or "compound source" generally indicated as 10, according to the present invention. The basic purpose of such a compound source 10 is to generate two independently-modulated beams, each beam being directed to a precise location on the photoreceptor 18. Compound source 10 includes two laser diodes 102 and 104, each, it will be noted, shown housed in an individual electronic "package". The diode packages for the laser sources 102 and 104, as shown in FIG. 1, are generally in the shape of the Model TOLD9211, made by Toshiba Corporation which are similar in size to the electronic industry standard TO-5 or TO-39 hermetically sealed packages commonly supplied by semiconductor manufacturers. It is to be understood that the two sources 102 and 104 are intended to be independentently controllable in a printing system; the operation of one source at a given moment should generally have no effect on the behavior of the other. As can be seen in FIG. 1, the diodes 102 and 104 are arranged so that the beams emitted therefrom are directed towards a common point between them. According to the present invention, the geometry shown in FIG. 1 with the flux from diodes 102 and 104 being emitted in opposition is simply a convenient physical arrangement for collecting a substantial portion of the emitted flux from both diode sources so that it can be redirected through an optical system.

Disposed between the diodes 102 and 104 is a "roof mirror" 106, which is preferably made from glass, aluminum, or other metal with optically reflective surfaces. The roof mirror 106 includes surfaces 110 and 112, which reflect the beams from diodes 102 and 104 respectively. The surfaces 110 and 112 are positioned and oriented relative to the diodes 102 and 104 so as to intersect each beam and redirect the flux of both in a common direction with minimum truncation loss. The reflective surfaces 110 and 112 are angled relative to each other such that the beams reflected from surfaces 110 and 112 have a common virtual source point, or extremely closely spaced pair of virtual source points, indicated as 116 in FIG. 1. Significantly, it is preferable that substantially no light flux from either diode in compound source 10 strike the other diode; such interference can cause undesirable coupling effects between the diodes. In the illustrated embodiment of the present invention, the design of roof mirror 106 is such that any destructive cross illumination is minimal.

By configuring two individual laser diodes 102 and 104 in standard packages relative to the roof mirror 106, a compound laser source can be created having virtual sources as closely spaced as desired. The two sources can even be coincident at the same virtual point. Because the two diodes 102 and 104 are protected in standard semiconductor packages, each may be tested separately so that pairs of devices can be selected for matched characteristics before installation. The roof mirror 106, which preferably comprises a single metal block, is easily conducive to mass production: for example, reflective surfaces 110 and 112 can be diamond machined on one edge of larger sheets of aluminum that are then diced to yield the individual roof mirror elements 106. Since the sheets can be batch processed, this fabrication method can yield a relatively large number of precisely-machined parts at very low cost. The relative angle between reflective surfaces 110 and 112 is governed by the output beam divergence angle of the particular type of diode used, the acceptable beam truncation factor, and the numerical aperture of the optical collimation system. In the case of the Toshiba TOLD9211, having Gaussian divergence angles of $27°\times7.5°$, truncation at the $1/e^2$ point in the narrow direction results in a preferred angle of $90°-7.5°=82.5°$ between reflective surfaces 110 and 112. The angle is chosen as low as possible to minimize the center line divergence of the two beams refected by facets 110 and 112, while the diverging gaussian beams emitted from the diodes are truncated as far off center as possible by the apex of roof mirror 106, so that the maximum flux of both beams can be collected by the collimator optics and directed toward the photoreceptor.

The configuration of the compound source of FIG. 1 with coincident virtual sources is optically equal to two physically superimposed laser sources with slightly different pointing directions and asymmetric but equal low level truncation. This configuration is useful for projecting closely spaced spots forming a raster on a photoreceptor, without the usual problems of cross illumination, cross-talk, or low yield associated with closely spaced monolithic devices. Furthermore, the virtual sources can be positioned in closer proximity than is physically possible with the laser diodes on a monolithic semiconductor die surface, so that there is no need for the odd interlace raster spacing architecture commonly used to avoid the crosstalk in dual monolithic scanner designs.

In overview, the intention is that the two beams 12a and 12b both propagate generally along a given direction, here indicated as 118, toward the desired target as if they were emitted from essentially the same point in space. By small adjustments of the relative positions of the two diodes 102 and 104 and the roof mirror 106, the wavefronts of both reflected beams can be oriented as though emitted from a common point within roof mirror 106 with the respective wavefronts of the beams sharing a common border at the line 118. In FIG. 1, it will be noted, an extension of line 118 passes through the apex of roof mirror 106 and also the common virtual source-point 116. Also, although in the illustrated embodiment the beams emitted from the respective diodes 102 and 104 are substantially parallel to each other when they come out of the diodes, this is a design convenience and an arrangement could be provided whereby the angle between the original beams could be more acute or obtuse, and the angle of the surfaces of the roof mirror 106 adapted accordingly.

Figure 2:
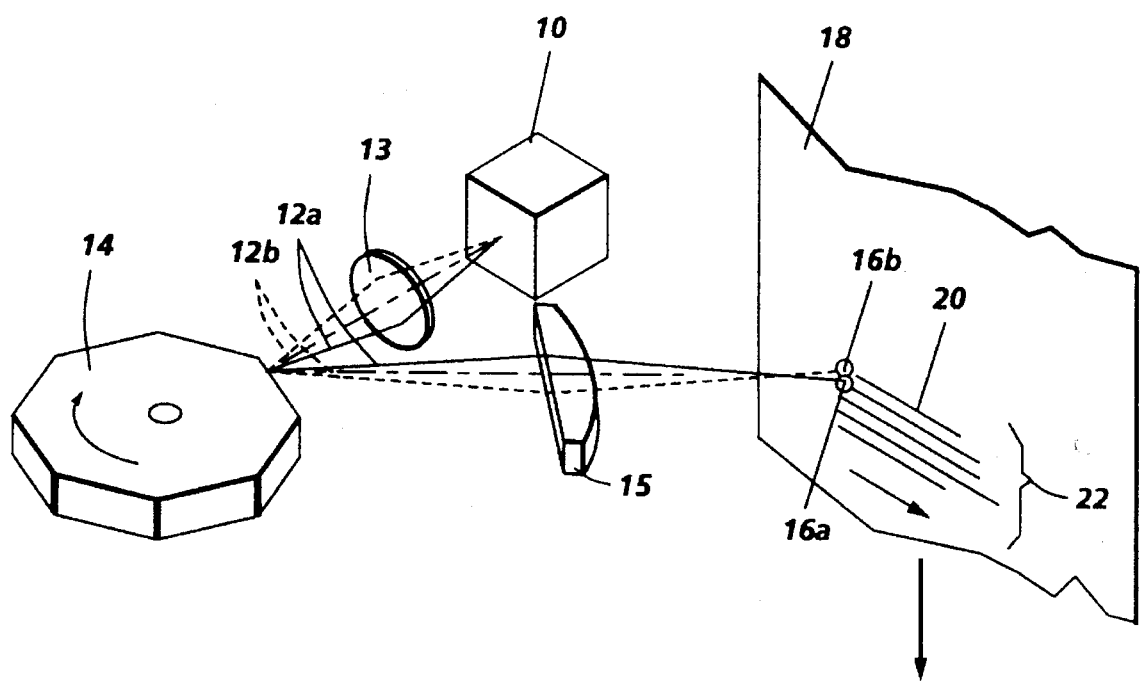
FIG. 2 is a perspective view showing the essential elements of a scanning system incorportaing a dual laser source according to the present invention.

FIG. 2 is a perspective view showing the elements of a scanning system incorporating a dual source as in the present invention, here shown generally as 10. There is emitted from source 10 two writing beams here shown as 12a and 12b. When the beams 12a, 12b emerge from source 10, they are divergent, although their respective wavefronts share a common border along line 118. The beams pass through a collimator represented schematically by lens 13, which focus the beams on the facets of the rotating mirror, or polygon, 14. Upon reflection from the facets of polygon 14, the beams 12a, 12b again diverge and are focused on the target surface by a lens 15, typically a type of projection lens known as an fθ design which has been optimized for constant spot velocity along the scan line. As is known in the art, the purpose of the fθ lens 15 is to redirect the writing beam progressively toward the ends of the scan line, in effect to allow more of each scan from rotating mirror 14 to be directed onto photoreceptor 18, as opposed to being directed to areas on either side of the photoreceptor 18; it also has the effect of slowing down the beam spot 16 towards the ends of the scan line. Beams 12a, 12b converge to form precisely spaced spots 16a and 16b on photoreceptor 18. The scanning displacement of spots 16a, 16b form scan lines 20 as the polygon 14 rotates, and a plurality of scan lines 20 together form the raster 22 of charged and discharged areas on the photoreceptor 18 to yield the desired latent image.

Figure 3A:
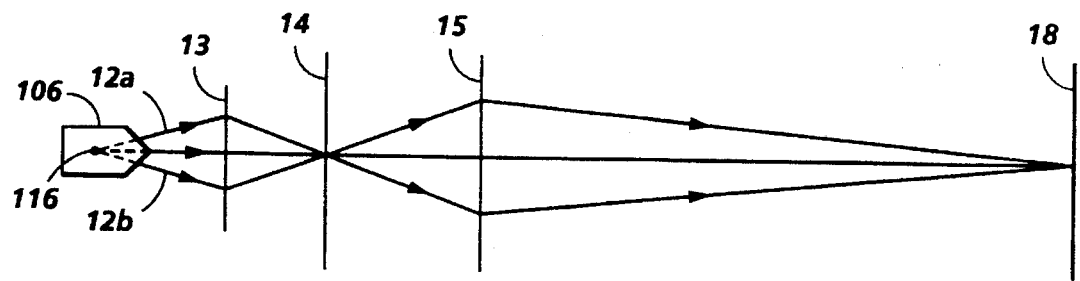
FIGS. 3A and 3B are simplified elevational views showing the different paths of the individual writing beams in two configurations of an embodiment of a scanning system incorporating a dual laser source according to the present invention.
Figure 3B:
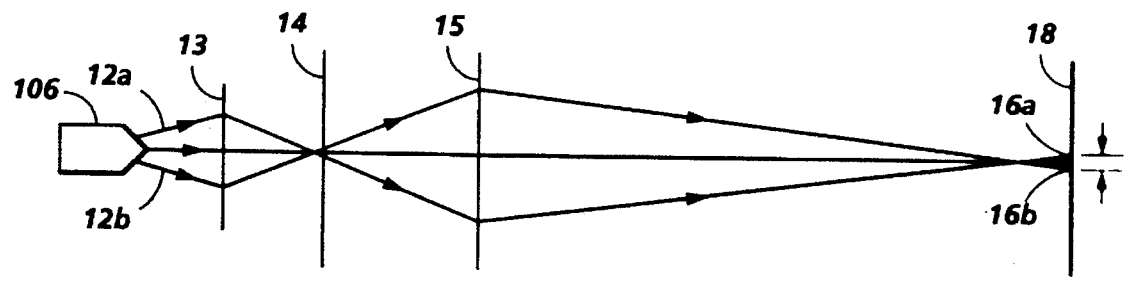

The size of the spots 16a and 16b formed by the writing beams 12a, 12b when they strike the photoreceptor 18 is dependent, of course, on the numerical aperture and magnification of the system which is a function of the overall optical design. FIGS. 3A and 3B are stylized views showing the paths of beams 12a, 12b as they pass through the various optical elements in a typical scanning system. FIG. 3A shows two beams 12a and 12b emitted from a common point striking exactly the same point on photoreceptor 18. The paths of 12a and 12b in FIG. 3A could equally well represent two diverging rays emitted from a single real source at the position of source point 116, or two rays, each emitted from one of two coincident virtual sources at point 116 as created by the compound source 10 of the present invention.

Significantly, the optical paths for both beams 12a and 12b are the same, and hence the nominal path of the scan line on the target surface will be the same for two virtual sources coincident at point 116, or for a real source located at point 116. In other words, because the two beams 12 and 12b have the same source point, the other optical elements in the scanning sytem will treat the two beams exactly equally, indifferent to the actual physical source of the light. An important consequence of this equality is that the resulting scan line geometry errors, i.e. the bow or deviation from a straight scan line, will be substantially identical for both beams as long as the optical design of the scanner is well corrected so that all paths, such as 12a and 12b from point 116, converge properly at a common point at the target surface along the entire scan line. Because the sources of the two beams 12a and 12b are not "off-center" relative to the surface of polygon 14 (as would be the case, for example, if the two diodes were each directly pointed at polygon 14 in a converging fashion) no scan bow will result directly from the design.

FIG. 3B shows how a small position adjustment can be made so that beam spots 16a, 16b strike photoreceptor 18 with a spacing of exactly the width of one scan line. In this particular configuration the beams 12a, 12b do not converge on the same spot on the facet of polygon 14. Generally, manipulation of the scan line spacing can be accomplished by moving the roof mirror 106 relative to the sources 102 or 104, or moving the sources 102 and 104 relative to the mirror, such that the two virtual sources at point 116 are not coincident.

Figure 4A:
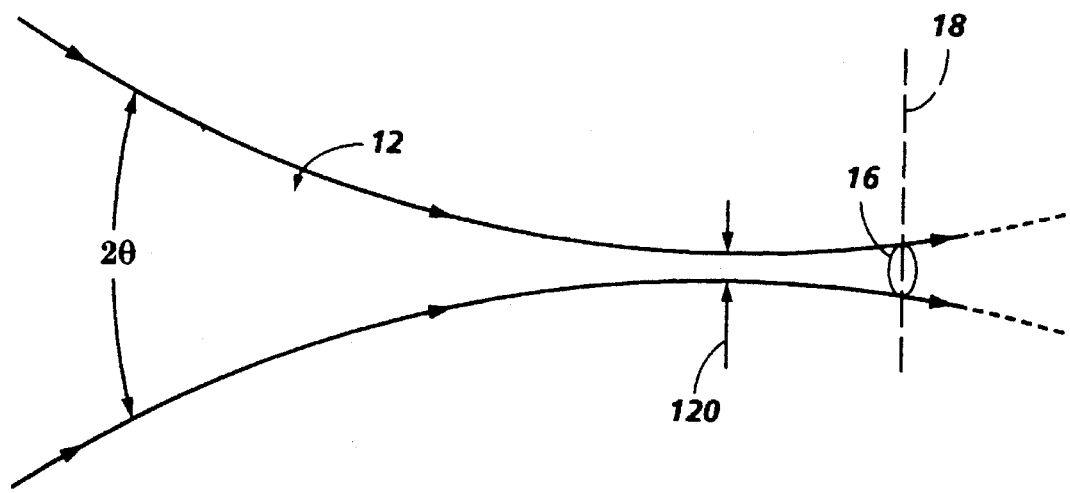
FIGS. 4A and 4B are detailed elevational views showing the distinction between the exposure beam propagation profile as practiced in the prior art, and the propagation profile with dual beams in the embodiment of a scanning system incorporating a dual laser source according to the present invention.
Figure 4B:
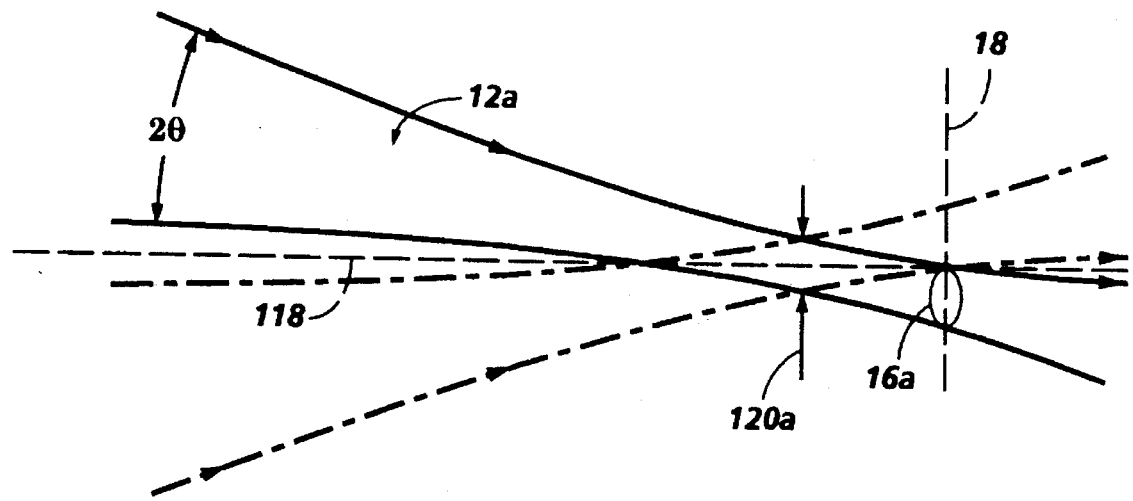

FIGS. 4A and 4B illustrate the comparative behavior of a one-beam system to that with two beams in the general vicinity of the surface of photoreceptor 18 where the beams are focused and exhibit hyperbolically shaped beam waists. At this particular portion of the system, the two writing beams following paths 12a, 12b behave very much like a single converging beam, as would occur when a single real source at point 116 emits light flux that is brought to a single focal point. In such a situation, the point of best focus is the point at which the "beam waist" has the smallest cross-section. FIG. 4A shows the case of a single wide beam converging to a point. The wave fronts in the beam are concave as the beam approaches the beam waist, become flat at the beam waist, and then are convex as the beam passes through the waist. The relative position of the surface of photoreceptor 18 relative to the beam waist 120 will effect the size of the spot formed on the surface of photoreceptor 18, since the beam spot 16 is just the cross section of the beam where it strikes the target photoreceptor surface 18. If the beam strikes the surface at exactly the beam waist 120, the resulting spot 16 will be at its minimum possible size; if the photoreceptor 18 is positioned in front of or beyond the waist, the resulting spot will be somewhat larger. The depth of focus of the system is simply a nominal distance indicating how far the target surface can be positioned away from the beam waist without objectionable spot size growth, usually agreed to be 10%.

When a dual source as in the present invention is used in the same optical scanning system, the wavefront propagation properties are essentially the same as when half of the single converging beam shown in FIG. 4A is "blocked out." FIG. 4B shows the profile at the waist of one individual beam 12a of the pair of beams in FIG. 2, in the vicinity of the photoreceptor 18. (The behavior of beam 12b is shown in phantom. For the full profile of beam 12b in isolation, the Figure need only be inverted.) When the profile of beam 12a is considered in isolation and compared to the profile of FIG. 4A, certain differences will be apparent. First, the beam waist 120a is wider than that shown FIG. 4A; very briefly, the reason for this is that in sharing the same optical system, beams 12a or 12b remain spatially separated and pass through only half of each lens surface. The convergence angle of the beam approaching the waist in FIG. 4B is therefore necessarily smaller than that in FIG. 4A by a factor of 2. Although the more gradual convergence of the profile in FIG. 4B indicates that a more robust depth of focus is possible than with the case of FIG. 4A, the minimum possible spot size, which is just the minimum beam waist profile and is proportional to the inverse tangent of the convergence angle, is twice as large in FIG. 4B. It is also apparent that the center of beam 12a is offset slightly from the center of the beam 12b. Thus, a certain amount of spacing between the centers of beams 12a and beam 12b will be evident; but this spacing can be exploited or compensated for as needed in a desired system, such as to simultaneously expose two neighboring scan lines. Such spacing may be adjusted to greater or lesser extents, depending on the specific requirements of the system, by, for example, adjusting the position of photoreceptor 18 within the limits allowed by the agreed upon depth of focus criteria, or, as mentioned above, adjusting the position of components such as the roof mirror 106 in source 10 relative to the diodes 102 and 104. The key advantage of the system in general, however, is that two beam spots may be spaced arbitrarily close on a target surface, or even superimposed as needed, without causing any undesirable interference of any kind between the two actual light sources.

Figure 5:
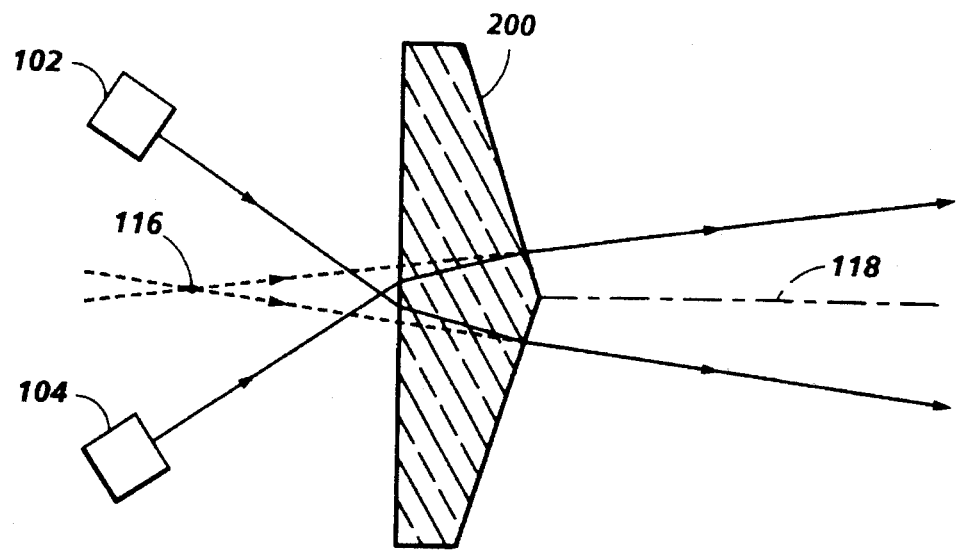
FIG. 5 is an elevational view showing the essential elements of a dual laser source according to an alternate embodiment of the present inevntion.
Figure 6:
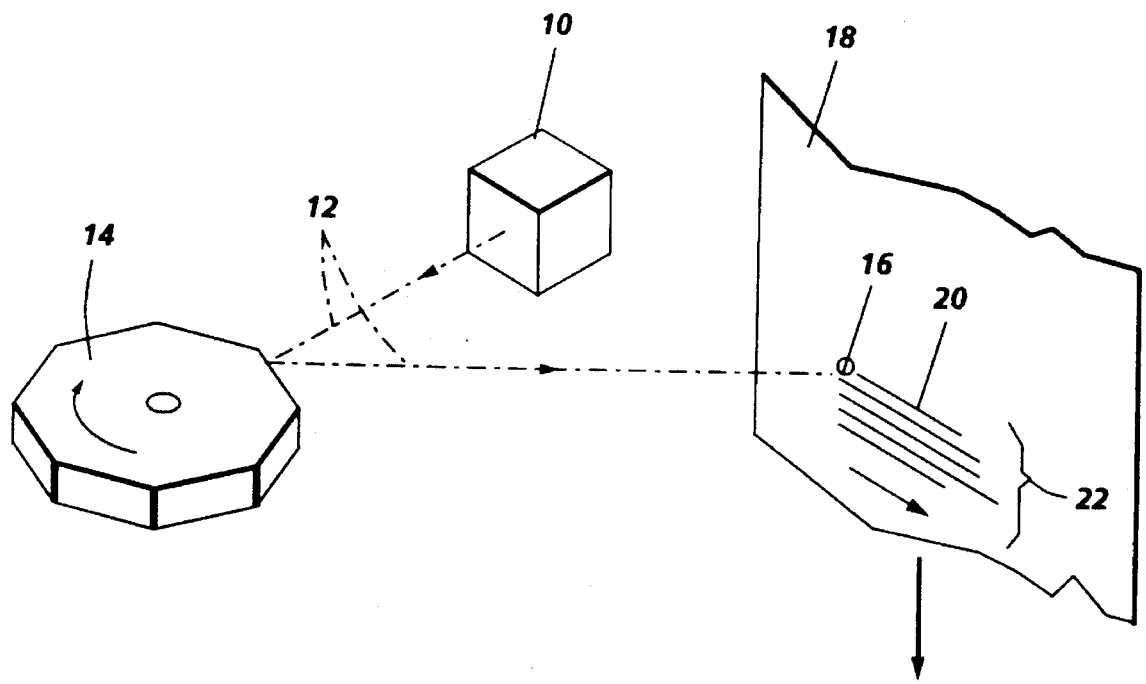
FIG. 6 is a perspective view showing the essential elements of a raster output scanner of the prior art.

Although a reflective roof mirror is illustrated as the preferred embodiment of the present invention, optically equivalent structures, exploiting refraction or diffraction, instead of reflection, could be provided, although probably at relatively greater expense. A refractive optical element, such as a prism or a structure defining a plurality of prisms, may be configured relative to the laser sources to enable the properties of a coincident or closely spaced virtual source point and divergence along a common axis. One possible example of such a prism-based source is shown in FIG. 5; like reference numerals indicate like elements as in FIG. 1. Here, instead of a roof mirror, there is provided a prism structure 200, of a given index of refraction, which is so shaped to provide, relative to diodes 102 and 104, a coincident virtual source point 116 along a direction 118. Special design care must be taken, however, if it is desired that the two refracted beams are to form wavefronts having a common border along direction 118, or if it is desired that no light flux from one diode be accidentally directed into the other diode, such as through internal reflection in the prism structure. Further, such a "refractive optical element" as recited in the claims may be embodied as a diffraction grating or Fresnel lens having a refractive effect equivalent to that of a prism structure such as that shown in FIG. 5.

A dual laser source as described above may further find use in a "tri-level" electrophotographic printer, in which the photoreceptor 18 is adapted to receive energy from a laser source at two discrete exposure levels, in order to wholly or partially discharge a given area of the photoreceptor. One conceivable configuration would be to operate one laser diode for partial discharge at a given spot on the photoreceptor, and both laser diodes for total discharge at that point. In such a case, of course, it is preferable that the two sources are adjusted to converge on substantially the same spot on the photoreceptor.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A scanning system comprising:
   a first laser source, emitting a first beam in a first direction;
   a second laser source, emitting a second beam in a second direction; and
   a roof mirror configured to direct the first beam and the second beam so that the first beam and second beam have a substantially coincident virtual source point.

2. The system of claim 1, further comprising:
   a first housing having the first laser source disposed therein; and
   a second housing, separate from the first housing, having the second laser source disposed therein.

3. The system of claim 1, wherein the first laser source and the second laser source are independently controllable.

4. The system of claim 1, wherein the roof mirror comprises a first reflective surface for reflecting the first beam and a second reflective surface for reflecting the second beam.

5. The system of claim 4, wherein the roof mirror is configured to direct the first beam and the second beam divergently along a third direction, the third direction passing through an intersection of the first reflective surface and the second reflective surface.

6. The system of claim 1, wherein the roof mirror is configured to direct the first beam and the second beam so that respective wavefronts of the first beam and the second beam share a common border along a third direction.

7. The system of claim 6, further comprising a rotating polygon disposed along the third direction, for scanning the first beam and the second beam across a surface.

8. The system of claim 6, further comprising a lens disposed along the third direction, to cause the first beam and the second beam to converge.

9. The system of claim 8, further comprising a target surface, and wherein at least the target surface, first laser source, second laser source, roof mirror, and lens are so configured that each laser source creates a discrete beam spot on the target surface, the respective beam spots being spaced on the target surface by a predetermined distance.

10. An electrophotographic printing apparatus, comprising:
    a photoreceptor; and
    a laser imager for creating an electrostatic image on the photoreceptor, including
       a first laser source, emitting a first beam in a first direction,
       a second laser source, emitting a second beam in a second direction, and
       a roof mirror configured to direct the first beam and the second beam along a third direction toward the photoreceptor, so that the first beam and second beam have a substantially coincident virtual source point.

11. The printing machine of claim 10, wherein the roof mirror is configured to direct the first beam and the second beam symmetrically divergently along the third direction.

12. The printing machine of claim 10, wherein the roof mirror is configured to direct the first beam and the second beam so that respective wavefronts of the first beam and the second beam share a common border at the third direction.

13. The printing machine of claim 10, further comprising a rotating polygon disposed along the third direction, for scanning the first beam and the second beam across the photoreceptor.

14. The printing machine of claim 10, wherein the photoreceptor and laser imager are so configured that each laser source creates a discrete beam spot on the photoreceptor, the respective beam spots being spaced on the photoreceptor by a predetermined distance.

15. A scanning system comprising:
    a first laser source, emitting a first beam in a first direction;
    a second laser source, emitting a second beam in a second direction; and
    a refractive optical element, configured to direct the first beam and the second beam so that the first beam and second beam have a substantially coincident virtual source point.

16. The system of claim 15, wherein the refractive optical element is configured to direct the first beam and the second beam symmetrically divergently along a third direction.

* * * * *